No. 738,200.

Patented September 8, 1903.

UNITED STATES PATENT OFFICE.

FRANZ JÜRSCHINA, OF STOCKHOLM, SWEDEN.

PROCESS OF MAKING ARTIFICIAL STONES.

SPECIFICATION forming part of Letters Patent No. 738,200, dated September 8, 1903.

Application filed March 24, 1902. Serial No. 99,758. (No specimens.)

*To all whom it may concern:*

Be it known that I, FRANZ JÜRSCHINA, a subject of the Emperor of Austria-Hungary, residing at Stockholm, Sweden, have invented certain new and useful Improvements in Processes of Making Artificial Stones; and I do hereby declare the following to be a full, clear, and exact description of the invention, such as will enable others skilled in the art to which it appertains to make and use the same.

This invention has reference to the manufacture of artificial stone proof both against changes of weather and temperature and against the action of acids.

Stone, blocks, or bricks manufactured in accordance with my invention are specially fitted for building purposes, face ornaments or figures, and facades generally and may also be used as paving-stones, flooring-tiles, or the like, in addition to which the material may be utilized in the manufacture of articles or utensils used in chemical and kindred industries—in fact, for all purposes for which material which is in a certain degree fireproof or fire-resisting is requisite or desired.

I am aware that artificial stone has heretofore been manufactured, consisting mainly of finely-ground sand, soluble glass, and a caking moldable substance or paste of, say, clay, kaolin, or the like, the moldable mixture composed of ingredients such as these being kneaded and subjected to powerful pressure, after which the blocks or bricks were dried and fired. That method of manufacture was sufficient where it was only desired to make bricks, paving-stones, tiles, and like articles having level surfaces; but ornaments, figures, and objects of a decorative nature, however, have not hitherto been obtainable by press-molding inasmuch as the press-molds necessary to produce them prove too expensive, while even apart from that the figures produced by their aid could not be by any means perfect, their contours not being brought out sufficiently sharp and distinct.

Now this invention has for its object an improved process whereby artificial stone, especially in the form of ornaments or figures, may be produced by casting in elastic molds like ordinary plaster casts.

The process may be carried out in the following manner: To one hundred parts of a solution of silicate of soda of a specific gravity of from 20° to 27° Baumé there is added from five to ten per cent., by volume, of ordinary clay or finely-ground augite or any other material possessing the same properties, the whole being well mixed. The clay is thus washed or "flushed" with silicate solution. The mixture is now left at rest for a few days, so that it becomes completely homogeneous. Owing to the addition of clay, the mixture undergoes no change, whereas, as is well known, a change does occur as a result of the treatment with silicate solution where no such addition is made. On the other hand, one hundred parts, by weight, of quartz, sand, or powdered stone is mixed with about ten per cent. of its weight of cement, preferably Portland cement. A small proportion of this mixture is now moistened with an adequate quantity of silicate solution, which is simply poured over it, the mixture being stirred into a semiliquid paste. The semiliquid substance is then poured or cast into a glue or similar mold, whereof all cavities or recesses become filled up with the substance. In two or three hours time the mixture will be found to have coalesced into a solid mass exactly reproducing the contours of the casting-mold. The articles produced in this manner are thereupon dried as usual at a temperature of from 25° to 30° centigrade and subsequently fired. For the purpose of firing the dried goods are placed in a furnace in which generally a temperature of from 1,000° to 1,400° centigrade should be maintained. At this temperature the substance mixed with the soda-silicate solution becomes thoroughly bound or united with the particles of sand, so as to form a perfectly dense material. After the firing has been continued for from twenty to twenty-five hours, the temperature being meanwhile gradually raised and then reduced again by degrees, the stones or other objects are gradually cooled in the furnace, an operation which takes from twenty to twenty-four hours to complete. The substances mixed with the silicate solution, which are mixed with sand in such small proportions, nevertheless impart to the finished stone a texture and appearance very nearly identical with that of natural stone.

An indispensable condition for the success of the casting process is the addition of cement, by which alone a rapidly-solidifying rigid substance can be obtained. Without an admixture of cement the material, no matter how long it may be left in the mold, will continue in its plastic paste-like condition.

Having thus described my said invention, what I claim as new therein, and desire to secure by Letters Patent, is—

The process of making artificial stone, which consists in mixing a silicate of an alkaline metal with clay to form a homogeneous mass, and then stirring this mixture into one of cement and sand, molding, drying and firing the product, substantially as described.

In testimony that I claim the foregoing as my invention I have signed my name in presence of two subscribing witnesses.

FRANZ JÜRSCHINA.

Witnesses:
 L. KALLANBERG,
 A. NORDBLOM.